United States Patent [19]

Warner

[11] Patent Number: 4,539,595
[45] Date of Patent: Sep. 3, 1985

[54] APPARATUS AND METHOD FOR CONVEYING CAMERA CONTROL INFORMATION ON THE BLACK BURST SIGNAL

[75] Inventor: James Warner, Woodbridge, Va.

[73] Assignee: Remote Vision Systems Limited Partnership, Baltimore, Md.

[21] Appl. No.: 509,583

[22] Filed: Jun. 30, 1983

[51] Int. Cl.³ .............................................. H04N 5/30
[52] U.S. Cl. .................................................... 358/210
[58] Field of Search .............. 358/210, 209, 227, 228, 358/139, 41, 147, 194.1, 142, 146, 86

[56] References Cited

U.S. PATENT DOCUMENTS

| | | | |
|---|---|---|---|
| 3,215,774 | 11/1965 | Ikegami | 358/210 |
| 3,534,160 | 10/1970 | Lowenstein | 358/210 |
| 3,752,907 | 8/1973 | Mazza | 358/210 |
| 3,916,436 | 10/1975 | Marey et al. | 358/210 |
| 4,170,024 | 10/1979 | Dischert | 358/41 |
| 4,190,863 | 2/1980 | Dischert | 358/210 |
| 4,190,864 | 2/1980 | Dischert | 358/210 |
| 4,318,131 | 2/1982 | Okuhara et al. | 358/210 |

Primary Examiner—Gene Z. Rubinson
Assistant Examiner—Stephen Brinich
Attorney, Agent, or Firm—Howard L. Rose

[57] ABSTRACT

Apparatus for transmitting camera control characteristic information from a central unit to a remote television camera by superimposing a series of pulse-position modulated (PPM) signals onto a black burst signal which includes transmitted synchronization signals, each PPM coded signal representing the value of a corresponding control characteristic. Specifically, between adjacent horizontal synchronization pulses which are outside vertical blanking intervals, a predefined sequence of time windows is provided and a pulse is positioned in each window. The window corresponds to a given control characteristic and the position of the pulse within the window represents the value of the given control characteristic.

19 Claims, 6 Drawing Figures

APPARATUS AND METHOD FOR CONVEYING CAMERA CONTROL INFORMATION ON THE BLACK BURST SIGNAL

FIELD OF THE INVENTION

The present invention relates to the art of controlling a camera with signals from a central unit.

TECHNOLOGICAL CONTEXT OF THE INVENTION

In U.S. Pat. No. 3,534,160 to Lowenstein, a camera system is taught in which signals to a camera unit from a control unit are sent on the back porch of blanking periods as 8-bit words. In accordance with this reference, the blanking period of each line transmitted by the control unit corresponds to a separate predetermined control function, so that the control function selected at the camera is based on the line during which the word was transmitted. The reference further notes that, preferably, each control function is repeated four times per frame period. The system taught by Lowenstein does not provide adjustment of more than one control for each line and permits an out-of-adjustment condition to continue unchecked for a quarter of the frame period.

A patent to Dischert, U.S. Pat. No. 4,170,024, discloses a system in which a camera receives control signals from a central control unit in the form of binary coded signals stored in random access memory. The Dischert patent discusses the problem of prior systems which have required over 80 lines between the base equipment and the camera head and confronts the problem by employing a multiple address digital memory, an address generator, and related apparatus to adjust iris, black level, gain, and balance controls. According to this reference, eight-bit data entered at a console is sequentially provided to a processor which, in turn, converts the data into a pulse amplitude modulated (PAM) form. The PAM signals are then coupled in time-multiplexed fashion to circuitry in the camera. The system discussed in the Dischert reference eliminates the need for the multiplicity of cables required by other camera systems, however achieves this end at the cost of relatively complicated data conveyance and processing. Moreover and particularly significant, the reference indicates that data is transferred in the form of one data bit per television line. A 96-line interval is, in this regard, defined during which four sections of three 8-bit words are conveyed. According to this reference, 8-bit words, each taking eight lines, determine (a) the address in a memory and (b) changes to be made in the memory, which information is repeated during a frame. Line-by-line control adjustment is thus not achieved and programming memory is required in practicing the system of the Dischert patent

SUMMARY OF THE INVENTION

The present invention provides for the simple adjustment of control signals between a central unit and a remote camera without requiring elaborate memory elements.

In addition, the invention has as an object the communicating of information for a plurality of camera control characteristics, which information is updated with each line.

Moreover, the present invention has as another object the conveying of information for each of numerous camera control characteristics over a single cable which already carries the black burst signal from a central unit to a camera. The invention thereby avoids the need for the numerous cables employed by various prior systems.

In achieving the above objects and others, the present invention is applied to a camera system that has a central unit which transmits a black burst signal to a camera over a single cable, the black burst signal including conventional synchronization signals. Specifically, at the central unit, horizontal synchronization pulses occurring outside the standard vertical blanking interval are separated from the black burst signal. In the spacing between each pair of adjacent horizontal sync pulses (outside vertical blanking intervals) are defined a plurality of time windows which are spaced apart. Each window corresponds to a control function—e.g. master pedestal, blue gain, or other standard controls. To determine the value of each control function, the central unit inserts a pulse in each window wherein the position of the pulse corresponds to the value of the control function. The central unit superimposes the positioned pulses onto the black burst signal between horizontal sync pulses (outside vertical blanking intervals). The black burst signal with the pulses superimposed thereon is conveyed over the single, currently employed cable to the camera. The camera reproduces the sequence of spaced windows and determines the position of each pulse in its corresponding reproduced window. Each pulse position is converted to an analog signal which can be then applied to control the camera.

In accordance with the invention, the horizontal sync pulses and the pulses within the vertical blanking intervals remain undisturbed. Conventional timing mechanisms are thus not interfered with.

In addition, by using PPM pulses, continuous, as well as fixed, discrete correction can be performed.

BRIEF DESCRIPTION OF THE DRAWINGS

FIG. I is a general diagram illustrating a transmitter of camera control information at a central unit and the input stage of a camera according to the invention.

FIG. II is a time diagram illustrating how PPM pulses which represent control inputs to the camera are superimposed onto a conventional black burst signal.

Figure 1:
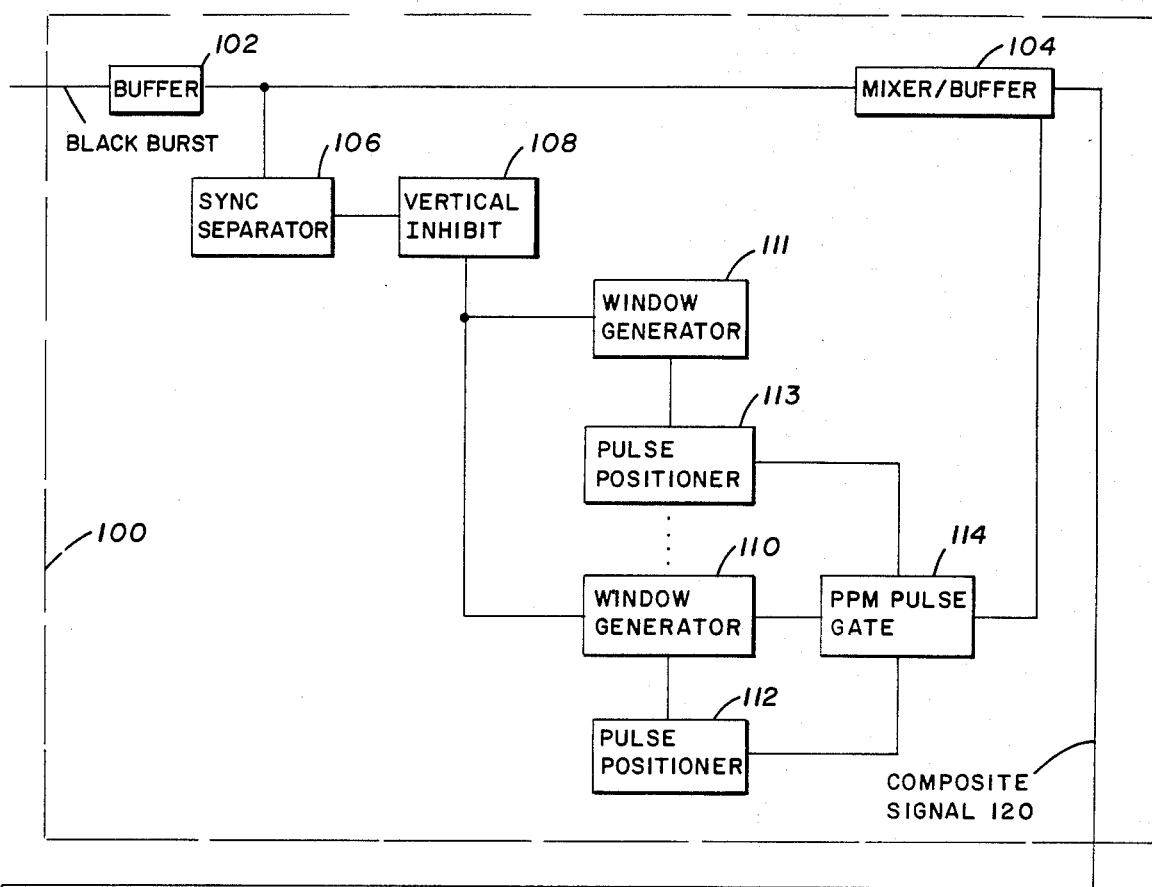
Figure 1:
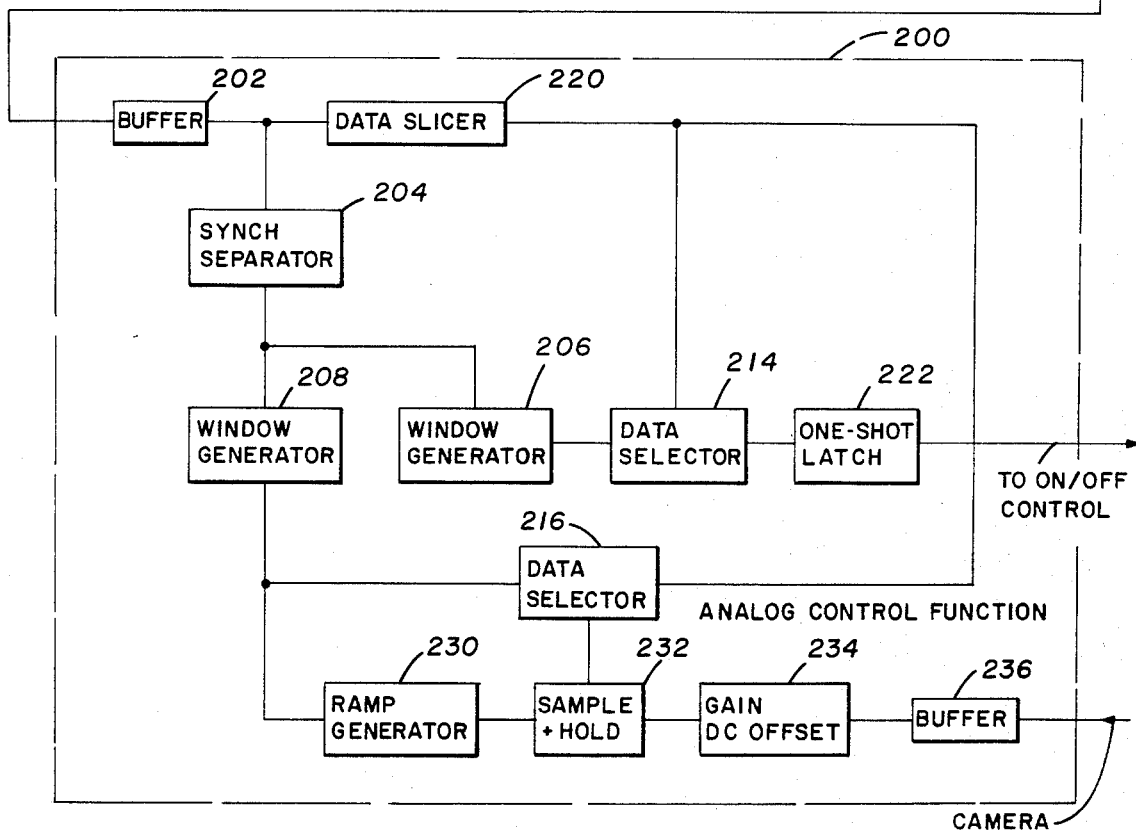
Figure 2:
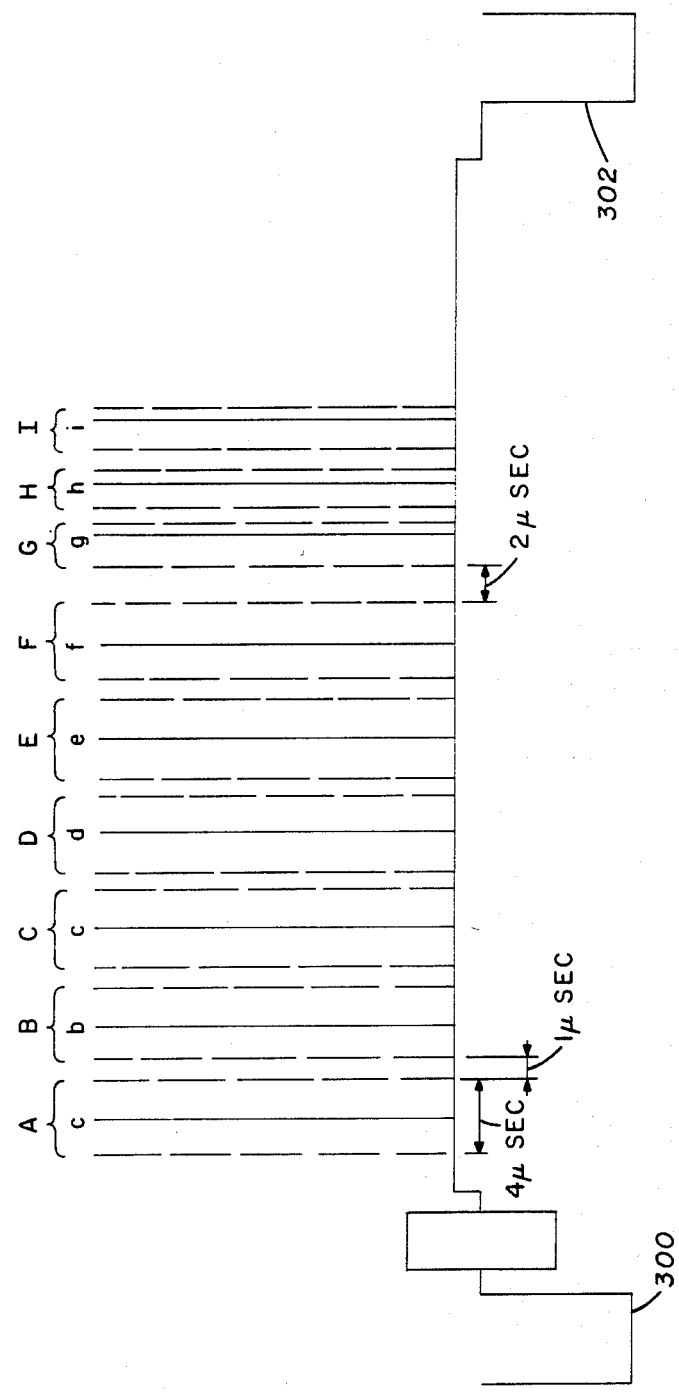
Figure 3A:
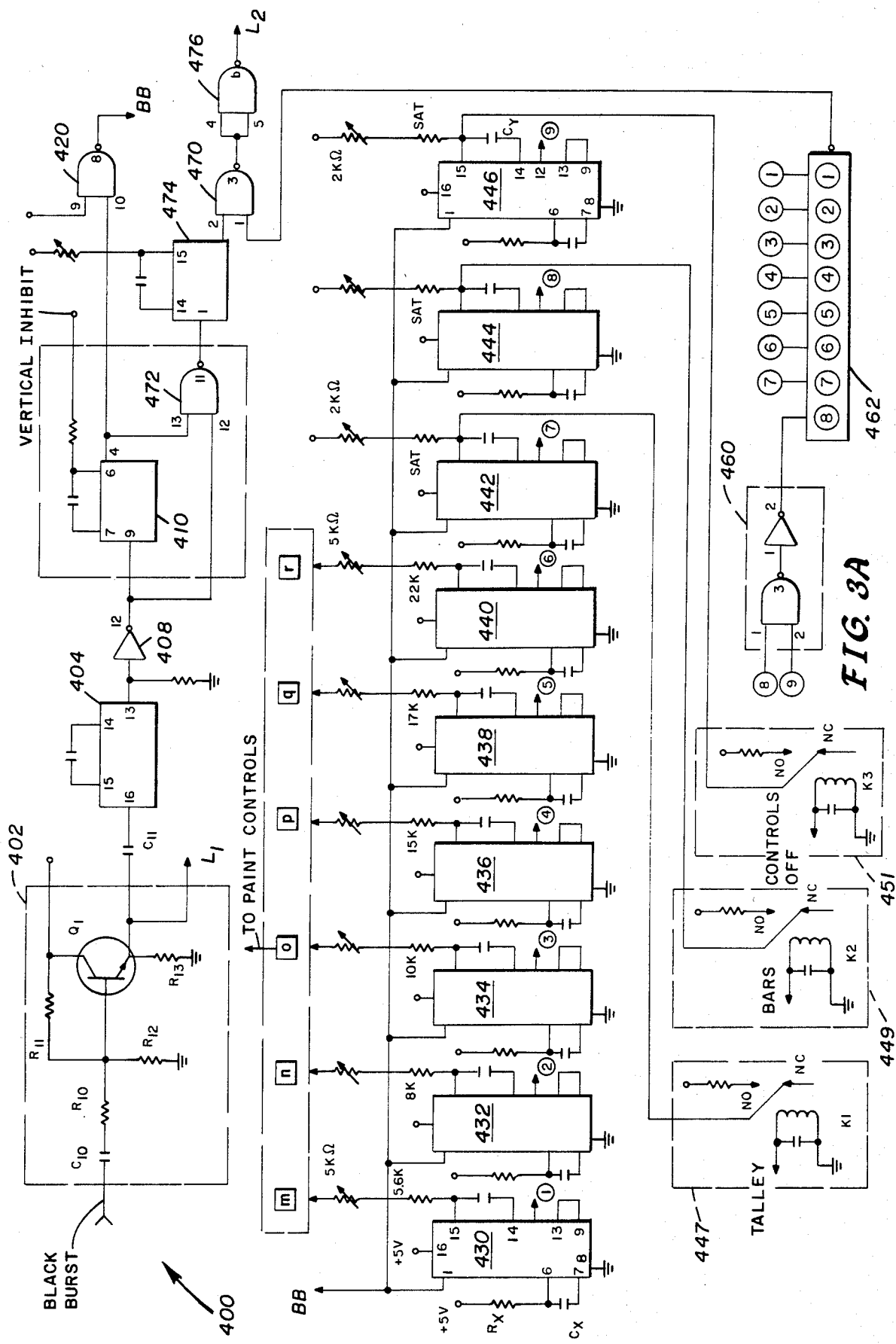
Figure 3B:
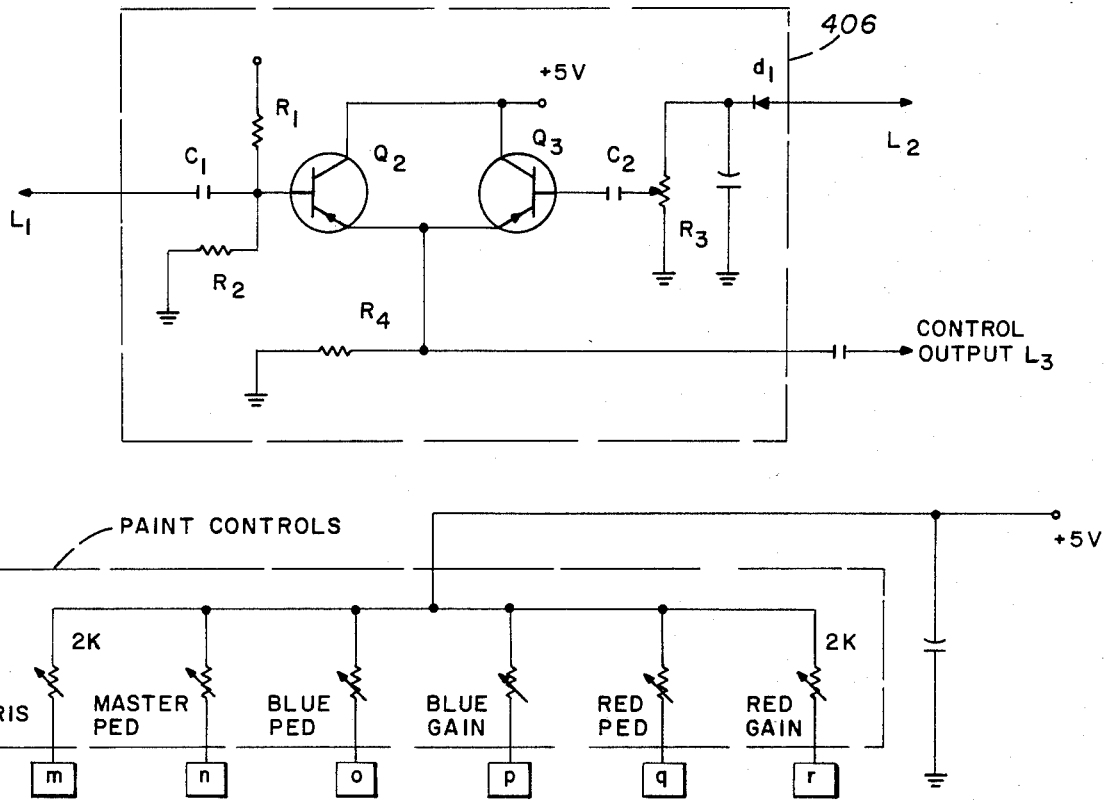
Figure 4A:
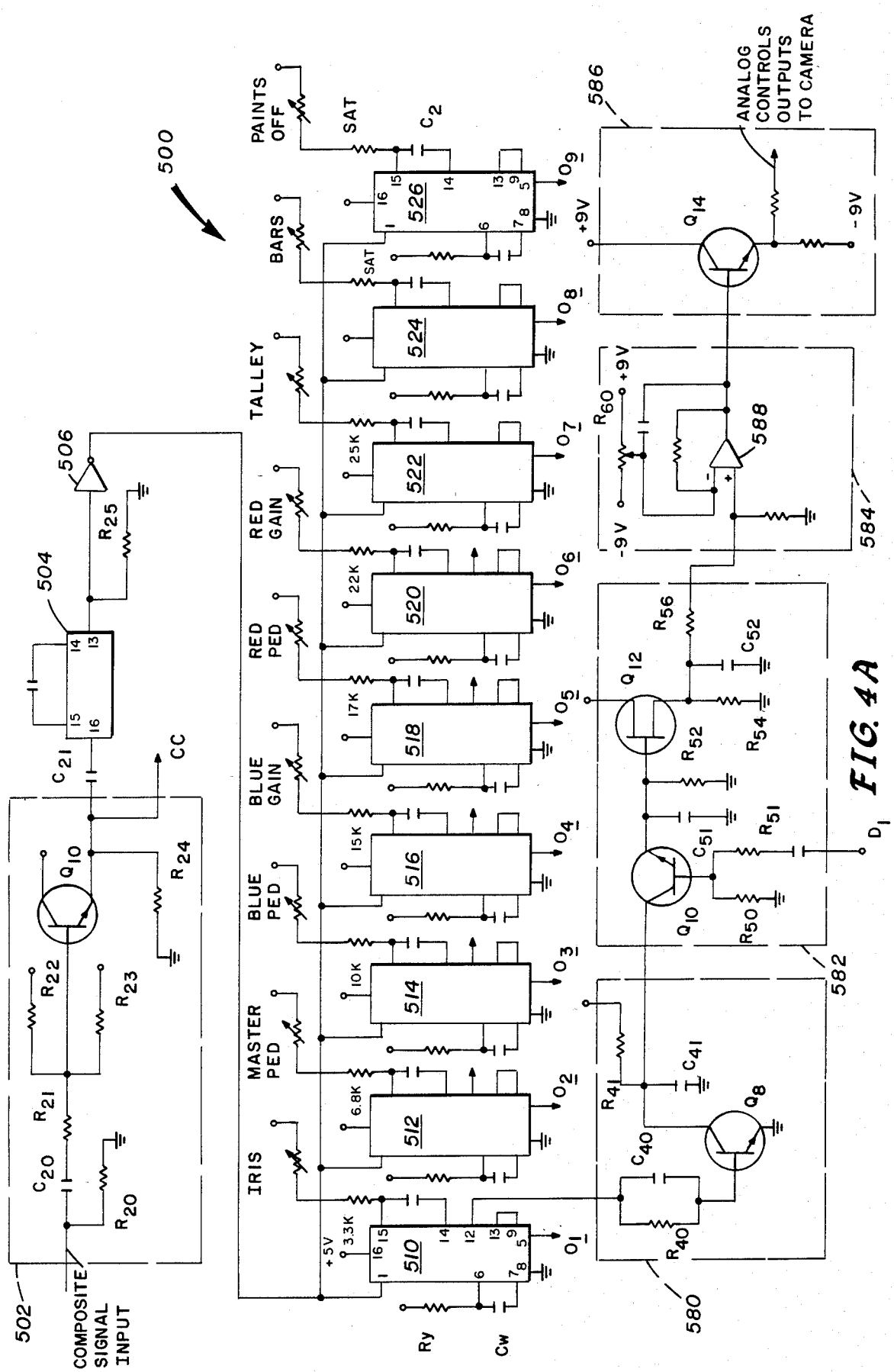
Figure 4B:
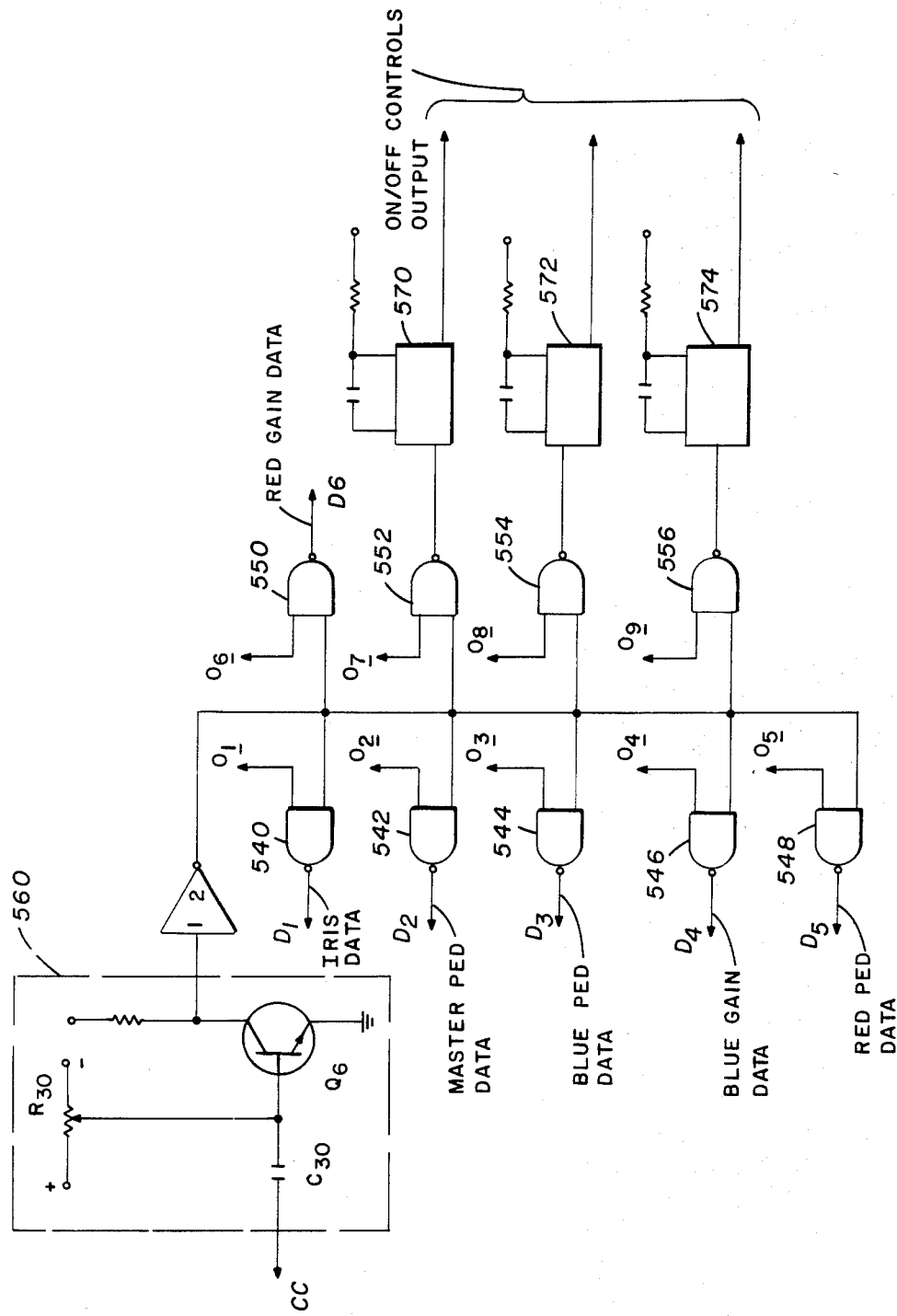

FIG. III(A) and III(B) is a detailed circuit diagram of a transmitter at a central unit according to the invention.

FIG. IV(A) and IV(B) is a detailed circuit diagram of the input stage of a camera according to the invention illustrating two channels, one channel controlling an on-off camera input and the other controlling an analog camera input.

DESCRIPTION OF THE INVENTION

Referring to FIG. I, a transmitter 100 is shown. The transmitter 100 is part of a central unit which conventionally generates a black burst signal that includes at least a number of standard pulses during vertical blanking intervals and horizontal sync pulses outside of the vertical blanking intervals. The black burst signal normally provides a locking reference between the central unit and remote cameras to which the central unit is connected.

In FIG. I, the standard black burst signal is shown entering a buffer 102. The output of the buffer 102 provides an input to (a) a mixer/buffer 104 (discussed below) and (b) a sync separator 106. The sync separator 106 strips the horizontal sync pulses from the black burst signal in conventional fashion. The horizontal sync pulses are directed through a vertical inhibit circuit 108 which passes only those horizontal sync pulses that are outside the vertical blanking interval. The pulses exiting the circuit 108 enter a plurality of window generators two of which are shown as window generators 110 and 111. The window generator 110 (like the other window generators) defines a unique time window between each pair of adjacent horizontal sync pulses outside the vertical blanking interval. Associated with the window generator 110 is a pulse positioner 112 which selectively generates a pulse and inserts it at a specific position in the window defined by generator 110. Associated with window generator 111 is a pulse positioner 113 for inserting a pulse in the window defined by generator 111. The specific position of a pulse in each generated window is determined by the individual who is monitoring the control inputs. This can be performed by turning a dial for a given input or by other similar methods at the central unit.

The positioned pulses from each window generator enter a gate 114. The output of the gate 114 is a sequence of pulse-position modulated (PPM) pulses—one for each window—the position of each PPM pulse indicating the value of a corresponding control function.

The sequence of PPM pulses enters the mixer/buffer 104 as one input, the buffered black burst signal from the buffer 102 being the other input. The PPM pulses are superimposed onto the black burst signal by the mixer/buffer 104 to form a composite signal.

The composite signal is conveyed along a cable 120 interconnecting the central unit and a camera remote therefrom. In FIG. I, the cable 120 is shown entering an input stage 200 of the remote camera. The composite signal passes through a buffer 202, the output of which follows two paths. Along one path the composite signal enters a sync separator 204 which provides horizontal sync pulses to each of a plurality of window generators, for example 206 and 208. Window generator 206 corresponds to an on/off control input, such as talleys or bars; window generator 208 corresponds to an analog control input, such as iris, blue gain, red gain, master pedestal, blue pedestal, or red pedestal. The purpose of the window generators 206 and 208 is to reproduce the time windows between the horizontal sync pulses carried on the composite signal. The window generators 206 and 208, in effect, determine time windows which correspond to the sequence of time windows defined in the transmitter 100.

The time window reproduced by the generator 206 is provided as an electrical input to a data selector 214. Similarly, the time window reproduced by the generator 208 is provided in electrical form to a data selector 216.

A data slicer 220 separates the PPM pulses conveyed as part of the composite signal. The PPM pulses from the data slicer 220 enter each of the data selectors 214 and 216 as input. Each data selector 214 and 216 thus has all PPM pulses as one input entering one line and a time window pulse that brackets the PPM pulse for a given characteristic as an input entering via a second line. Each data selector 214 and 216, by gating the inputs thereto, provides a positioned pulse output corresponding to a specific camera control characteristic, or function.

Data selector 214 corresponds to an on/off control. Hence, a one-shot latch 222 is provided to communicate a switchable input to the camera. Data selector 216 corresponds to an analog camera control characteristic. To derive useful data from the output of the data selector 216, a ramp generator 230 and a sample-and-hold circuit 232 are included. The ramp generator 230 is triggered to initiate a ramp signal at the start of each window pulse produced by the generator 208. The ramp signal enters the sample-and-hold circuit 232 together with the pulse output of the data selector 216. The value of the ramp signal at the time a pulse exits the data selector 216 is retained by the sample-and-hold circuit 232 in conventional fashion. The value retained by the circuit 232 enters a gain and offset stage 234 as an analog output. The stage 234 amplifies the analog output of the circuit 232 and adjusts for desired d.c. range as appropriate. A buffer 236 couples the output of the stage 234 to provide an analog control input to the camera.

Additional control signals are provided by adding parallel channels in the transmitter 100 and in the input stage 200 of the camera. That is, the transmitter 100 with parallel channels provides periodically a series of separate windows with a pulse selectively positioned in each window. Each of the parallel channels at the input stage 200 separates out a particular window which occurs during the same time interval during each successive period and determines the position of the pulse in the particular window every period.

FIG. II illustrates how a plurality of control signals are communicated to a camera from a central unit. Specifically, two horizontal sync pulses 300 and 302 (occurring outside the vertical blanking interval) are shown. Between the pulses 300 and 302 are nine time windows A through I, illustrated by exclusive pairs of adjacent dashed lines. In each time window A through I is a pulse a through i, respectively, which is selectively positioned in the window corresponding thereto. The pulses are represented by solid lines. Each window A through I carries information pertaining to a specific camera control characteristic, the position of the pulse in each window indicating the value of the control characteristic. The windows A through F correspond to analog control inputs and are each shown as a four microsecond time interval along which a relatively short pulse therein is positionable. Between each pair of adjacent windows that correspond to analog controls is shown a one microsecond spacing.

On/off control windows, G, H, and I are shorter in interval, for example two microseconds as in FIG. II, and are spaced from each other by one microsecond. Preferably, window F and window G are separated by a two microsecond spacing. The positioned pulses shown in FIG. II are superimposed onto a black burst signal by a transmitter (see FIG. I) at the central unit to form a composite signal. The composite signal enters the input stage (see FIG. I) of the camera, the input stage having a channel for each window A through I. Each channel in the input stage determines the relative position of the pulse (e.g., a) in a given window (e.g. A) and produces an analog control signal corresponding thereto.

Specific circuitry showing one embodiment of the invention is depicted in FIGS. III and IV. FIG. III is a transmitter 400 of a central unit. FIG. IV is an input stage 500 to a remote camera.

Referring to FIG. III, a black burst signal is shown entering a buffer 402 including transistor QI and resistor $R_{10}$ through $R_{13}$ and capacitor $C_{10}$. The buffer 402 provides an output which is split, the output entering a sync separator 404 (preferably an AN 301 IC) and via $L_1$ a buffer mixer 406 (preferably 2N3904 transistors with coupled emitters and collectors and related circuitry). The output of the sync separator 404 is inverted by a stage 408 and fed through a vertical inhibit stage 410, preferably a 74LS123 integrated circuit (IC) with a related RC circuit. The output of the stage 410 is passed through a gate 420 which provides horizontal sync pulses (HSYNC) that occur only outside vertical blanking intervals—vertical inhibit stage 410 inhibiting pulses occurring during the vertical blanking intervals. The HSYNC pulses (outside the vertical blanking intervals) provide input to each of nine pulse-in-window generators 430 through 446—each generator preferably comprising two one-shot elements in a 74LS123 IC. Each generator 430 through 446 is also provided with a resistor $R_x$ (preferably 920Ω), a capacitor $C_x$ (of preferably 0.0002 μf), and a capacitor $C_y$ (of preferably 0.005 μf) connected thereto. As configured, each generator 430 through 446 is triggered by the input of a horizontal sync pulse to start a control pulse. With the fixed resistances and capacitances, the control pulse can be terminated at a time within a given unique interval or window. The precise termination time analog control pulses is variable by the "paint control" inputs m through r. Upon termination of each control pulse, a data pulse is generated and entered onto the appropriate output terminal (1) through (9).

The pulse-in-window generators 430 through 440.are each shown having a corresponding unique RC timing circuit which determines a time window in which a pulse can be positioned. In this regard, it is noted that these successive generators have a capacitance $C_y$ and a unique resistance ranging from 5.6 kilohms to 22 kilohms in their respective RC timing circuits.

Generators 442, 444, and 446 have resistive values selectable at the time of test (SAT). In addition, each of these control inputs is selectively disabled by a separate switch circuit 447, 449, and 451.

The generators 430 through 440 correspond to analog control inputs—such as iris, master pedestal, blue pedestal, blue gain, red pedestal, and red gain, respectively, the "paint control" inputs m, n, o, p,.q and r varying the RC fall off time of the control pulse for each generator responsive to an HSYNC input thereto. An individual monitoring the camera at the central unit can adjust the 2 kilohm resistors at m, n, o, p, q, and r, thereby adjusting the time at which the generators 430 through 440, respectively, generate pulses at their respective output terminals (1) through (9).

It is noted that the generators 430 through 446 are configured to define the windows A through I as shown in FIG. II and the paint controls m through r determine the position of pulses a through f within each window A through F, respectively.

The pulse outputs of generators 444 and 446 are gated together in gating network 460 to provide a single output to a NAND gate 462. The gate 462 also receives the output pulses from each generator 430 through 442. The output of the gate 462 represents a series of PPM pulses like those shown in FIG. II. The output of the gate 462 is gated in NAND gate 470 with a second input thereto.

The second input to gate 470 is formed by entering the output of the invertor stage 408 as one input to a NAND gate 472, the output of the vertical inhibit stage 410 being the other input. The output of the gate 472 enters a stage 474 which selectively adjusts the position of the output of the gate 472 by an adjustable RC circuit. The output of the gate 462 and the stage 474 are NANDed in gate 470.

The output of gate 470 is inverted by element 476. The output of element 476 represents a series of PPM pulses between each pair of adjacent HSYNC pulses that occur outside the vertical blanking intervals.

The output from element 476 is superimposed onto the black burst signal in the buffer mixer 406. The black burst signal enters the buffer mixer 406 on line $L_1$ and the output from element 476 enters on line $L_2$. Exiting from the buffer mixer 406 on line $L_3$ is a composite signal including the black burst signal with the PPM pulses superimposed thereon (as shown in FIG. II). The buffer mixer 406 preferably includes two transistors Q2 and Q3, the base of Q2 being coupled to line $L_1$ through a capacitor $C_1$ and biased by resistors $R_1$ and $R_2$. The base of Q3 receives input from line $L_2$ via a diode $d_1$, an adjustable resistor $R_3$, and a capacitor $C_2$. Output at line $L_3$ is taken at the coupled emitters of Q2 and Q3 across a resistance $R_4$.

Referring now to FIG. IV, an input stage 500 to a camera is shown. The composite signal formed in the FIG. III transmitter 400 enters a buffer 502, comprised of a transistor $Q_{10}$, resistor $R_{20}$ through $R_{24}$, and capacitor $C_{20}$. The buffered signal passes through capacitor $C_{21}$ and then through a conventional sync separator 504 and invertor 506. The ungrounded terminal of resistor $R_{25}$ is connected between the sync separator 504, where it is output to 560 (data slicer) and the invertor 506.

The output of the invertor 506 includes horizontal sync pulses. These pulses are fed as input to each of nine stages 510 through 526 which reproduces windows responsive to the input of a horizontal sync pulse thereto, each reproduced window corresponding to a window defined by the transmitter 400 of FIG. III. Each stage 510 through 526 includes two cascaded one-shots, preferably of a 74 LS 123 IC. Each generator 510 through 520 has a resistor $R_y$ (of preferably 5.6 kilohms) whereas each generator 522 through 526 has a resistor $R_z$ (of preferably 2.2 kilohm). Each generator 510 through 526 has a capacitor $C_w$ (of preferably 0.0022 μf) and a capacitor $C_z$ (of preferably 0.005 μf). Forming an RC time circuit with each capacitor $C_z$ is a (a) fixed resistor which varies in value from, preferably, 3.3 kilohms in generator 510 to 25 kilohms in generator 522 and (b) a variable resistance adjustable from, preferably, 5 kilohms. Generators 524 and 526 have a fixed resistance in the RC time circuit which is selectable (SAT).

From each generator 510 through 520, two outputs are provided, each corresponding to the reproduced window formed by each respective generator. The first window pulse output $O_1$ through $O_9$ from each generator 510 through 526, respectively, enters a corresponding respective gate 540 through 556 (of FIG. IV(B)).

Entering each gate 540 through 556 as a second input is data that is sliced by a data slicer 560 from the invertor 506 output signal carried on line CC. The data slicer 560 passes a signal including horizontal sync pulses of one polarity and PPM pulses of the opposite polarity into the base of grounded emitter transistor Q6 (preferably a 2N3904) via capacitor $C_{30}$ (preferably of 100 μf). The transistor Q6 is biased by a resistor $R_{30}$ adjustable preferably from 10 kilohms and a resistor $R_{31}$ of preferably 2 kilohms. The output of Q6 corresponds to the PPM pulses.

The output of each gate 552 through 556 represents an on/off control signal which is processed by circuits 570, 572, and 574, respectively, enroute to the respective camera control inputs. Circuits 570 through 574 are preferably 74LS123 elements which provide an output or not dependency on pulse position.

The respective output $D_1$ through $D_6$ from each gate 540 through 550 represents the PPM pulse corresponding to the window reproduced by generators 510 through 520, respectively. To convert each PPM pulse into a corresponding analog signal, a ramp generator and a sample-and-hold circuit is provided for each of the generators 510 through 520 which convey analog control information. That is, each generator 510 through 520 provides a second output therefrom to a ramp circuit, such as circuit 580 which is coupled to the second output of generator 510. The ramp signal from circuit 580 enters a sample-and-hold circuit 582 which receives input from $D_1$ the output of gate 540. The circuit 582 retains the value of the ramp signal existing at the time the PPM pulse on $D_1$ is entered. The retained value passes through a d.c. offset, amplifying stage 584 after which the signal is buffered by transistor stage 586. The stage 584 is, preferably, an LM 324, and the stage 586 includes preferably a 2N 3904 transistor.

In operation, the second output from the generator 510 passes through resistor $R_{40}$ and capacitor $C_{40}$ to the base of transistor Q8 (preferably a 2 SC 1636 transistor). The Q8 output passes through the junction between resistor $R_{41}$ and capacitor $C_{41}$. As input to the base of Q8 from the $R_{40}C_{40}$ circuit increases, a ramp signal is produced which enters transistor Q10. The base of Q10 is coupled to (a) a resistor $R_{50}$ and (b) a resistor $R_{51}$ and capacitor $C_{50}$, the output $D_1$ of gate 540 entering Q10 via the $R_{51}C_{50}$ series. The output of transistor Q10 enters a FET Q12. The FET Q12 preferably comprises a 2 SK 43 and is coupled to resistors $R_{52}$, $R_{53}$, and $R_{54}$ and capacitors $C_{51}$ and $C_{52}$ as shown.

The output of FET Q12 represents a value corresponding to the PPM pulse position for the iris camera control characteristic. The Q12 output passes through a d.c. offset circuit 584 which adjusts the analog control to a desired camera compatible range. For iris control, the preferable range is 0 to +8 volts. The range for gains and color pedestals is preferably −5 volts to +5 volts. The preferable master pedestal range is −2 to +5 volts. Talley bars and controls vary preferably between 0 and +5 volts.

The circuit 584 includes a variable resistor $R_{60}$ which varies the relative values in an RC feedback circuit of an amplifier 588. The buffer 586, including a transistor Q14 (preferably a 2N3904), directs the iris analog control information to the iris control input of the camera.

As previously noted, each generator 510 through 520—which provides analog information—includes its own channel for converting its PPM pulse to an analog value. In effect, each such channel includes a ramp signal generated at the start of a window and held at the value existing when the PPM pulse is detected after the beginning of the window.

Preferably the windows defined by the transmitter 400 of FIG. III and the windows reproduced by the generators 510 through 526 of FIG. IV are the same in duration and spacing therebetween. This helps keep the central unit and camera synchronized. In any case, duration and spacing are adjustable to correlate the transmitter windows and camera generated windows as desired.

The values of resistances and capacitances shown in the Figures may be selected to achieve desired operational parameters. Preferably, the values correspond to timing values for standard color television camera equipment.

Moreover, the number of analog control characteristics and corresponding channels employed may be varied.

Other improvements, modifications and embodiments will become apparent to one of ordinary skill in the art upon review of this disclosure. Such improvements, modifications and embodiments are considered to be within the scope of this invention as defined by the following claims.

In this regard, it is observed that the specific circuits and elements disclosed are set forth by way of example and that other circuits, elements and the like may be employed in accordance with the scope of the invention as set forth in the claims.

I claim:

1. Apparatus for communicating camera control characteristic information from a central unit to a remote camera, the central unit and the remote camera having a communication link therebetween over which a black burst signal, including (a) horizontal synchronization pulses and (b) pulses during periodic vertical blanking intervals is sent from the central unit to the remote camera, the apparatus comprising:

first circuit means for defining a sequence of spaced time windows between each pair of the adjacent horizontal synchronization pulses of the black burst signal which occur outside the vertical blanking intervals; and second circuit means for generating a pulse position modulated (PPM) pulse in each window defined between said each pair of adjacent horizontal synchronization pulses; and third circuit means for superimposing the generated PPM pulses onto the black burst signal between said each pair of adjacent horizontal synchronization pulses, said PPM pulses being distinguishable from the black burst signal;

each window representing a variable camera control characteristic and the position of each PPM pulse in said each window indicating the value of the camera control characteristic represented by said each window.

2. An apparatus as claimed in claim 1, further comprising:

fourth circuit means for selectively adjusting the position in time of each PPM pulse in the window corresponding to said each PPM pulse.

3. An apparatus as claimed in claim 2, wherein said first circuit means includes:

fifth circuit means for separating the horizontal synchronization pulses occurring outside the vertical blanking intervals from the black burst signal;

sixth circuit means for triggering a plurality of control pulses responsive to the receiving of a horizontal synchronization pulse from said fifth means; and seventh circuit means for limiting the time at which each control pulse can terminate to a specific one of a series of spaced time intervals between said two adjacent horizontal synchronization pulses, the interval in which each control pulse terminates being unique for said each control pulse;

each interval representing one of said windows.

4. An apparatus as claimed in claim 3, wherein said second circuit means includes:

eighth circuit means for producing data pulses, each data pulse being produced in response to the termination of a corresponding control pulse; and wherein said fourth circuit means includes:

ninth circuit means for adjusting the time at which said control pulse terminates within the time interval corresponding thereto;

each data pulse representing a PPM pulse selectively positioned in time in the window corresponding thereto.

5. Apparatus for communicating camera control characteristic information from a central unit to a remote camera, the central unit and the remote camera having a communication link therebetween over which a black burst signal, including (a) horizontal synchronization pulses and (b) pulses during periodic vertical blanking intervals is sent from the central unit to the remote camera, the apparatus comprising:

first circuit means for defining a sequence of spaced time windows between a pair of the adjacent horizontal synchronization pulses of the black burst signal which occur outside the vertical blanking intervals; and second circuit means for generating a pulse position modulated (PPM) pulse in each window defined between said pair of adjacent horizontal synchronization pulses; and third circuit means for superimposing the generated PPM pulses onto the black burst signal between said pair of adjacent horizontal synchronization pulses, said PPM pulses being of opposite polarity from pulses in the black burst signal;

each window representing a variable camera control characteristic and the position of each PPM pulse in said each window indicating the value of the camera control characteristic represented by said each window.

6. In a television system having a central unit which sends to a remote camera a black burst signal including horizontal synchronization pulses and pulses during periodic vertical blanking intervals, apparatus for communicating camera control characteristic information to the camera from the central unit, the apparatus comprising:

transmitter means, at the central unit, for superimposing onto the black burst signal at least one pulse position modulated (PPM) pulse in a corresponding unique time window between each pair of adjacent horizontal synchronization pulses outside the vertical blanking intervals to form a composite signal, said PPM pulses being distinguishable from the remainder of the composite signal and the position of a given PPM pulse in the window corresponding thereto representing the value of a corresponding camera control characteristic;

a medium along which the composite signal is conveyed to the camera from the central unit; and receiver circuitry including:

means at the camera, for receiving the composite signal conveyed along said medium.

7. Apparatus as claimed in claim 6, wherein said receiver circuitry further includes:

means for determining, for each PPM pulse in the composite signal received at the receiving means, the relative position of each PPM pulse within the window corresponding thereto.

8. Apparatus as claimed in claim 7, wherein said receiver circuitry further includes:

means for converting the determined position of said each PPM pulse into a corresponding analog signal, the amplitude of said corresponding analog signal being dependent on the position of said each PPM pulse.

9. Apparatus as claimed in claim 8, wherein said converting means includes:

means for transforming the position in time of the PPM pulse in said each window into an analog signal, the amplitude of which increases with increasing time between the beginning of each window and the occurrence of the PPM pulse therein.

10. Apparatus as claimed in claim 9, wherein said medium is a single cable.

11. A method of communicating control signal characteristic information from a central unit to a camera over a single cable, adapted to convey a black burst signal which includes pulses during vertical blanking intervals and horizontal synchronization pulses outside the vertical blanking intervals;

the method comprising the steps of:

defining a sequence of separate windows between each pair of adjacent horizontal synchronization pulses in the black burst signal which are outside the vertical blanking interval;

selecting a position in each separate window;

inserting a separate pulse at the selected position in each separate window defined between adjacent horizontal synchronization pulses (a) in the black burst signal and (b) outside the vertical blanking intervals; and transmitting the black burst signal with the inserted pulses superimposed thereon as a composite signal along the single cable from the central station to the camera.

12. A method as claimed in claim 11 comprising the further step of:

reproducing at the camera the defined sequence of separate windows from the composite signal; and determining at the camera from the composite signal the position of each inserted pulse in the reproduced separate window corresponding thereto.

13. A method as claimed in claim 12 comprising the further step of:

converting the determined position of each inserted pulse into an analog signal.

14. A method as claimed in claim 11, wherein the window defining step includes the steps of:

setting a time interval that bounds each window; and setting the spacing between each pair of adjacent windows.

15. A method as claimed in claim 13, wherein the window defining step includes the steps of:

setting a time interval that bounds each window; and setting the spacing between each pair of adjacent windows.

16. A method as claimed in claim 15, wherein the time interval setting step includes the step of:

setting a first time interval for two-state control signal characteristics and setting a second time interval for control signal characteristics having more than two states.

17. A method as claimed in claim 16, wherein said second time interval is approximately four microseconds and said first time interval is approximately two microseconds.

18. A method as claimed in claim 17, wherein the spacing between adjacent windows is approximately one microsecond.

19. In a system having a central unit which communicates to a camera a composite signal that includes control inputs and a black burst signal of (a) pulses in a vertical blanking interval and (b) horizontal synchronization pulses outside the vertical blanking intervals, a camera including:

receiver circuitry at the camera for detecting in a composite signal the position of each of at least one pulse position modulated (PPM) pulse that is (a) positioned between two horizontal synchronization pulses which are outside the vertical blanking intervals and (b) electrically distinguishable from pulses in the black burst, wherein each PPM pulse represents a distinct control input to the camera and the position represents the value thereof.

* * * * *